United States Patent
Ephrati et al.

(10) Patent No.: US 7,558,752 B1
(45) Date of Patent: Jul. 7, 2009

(54) METHOD AND AN APPARATUS FOR A TRADING MARKET DESIGN AND DEPLOYMENT SYSTEM

(75) Inventors: Eithan Ephrati, Sunnyvale, CA (US); Yoav Shoham, Palo Alto, CA (US); Michael Wellman, Ann Arbor, MI (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 09/410,856

(22) Filed: Oct. 1, 1999

Related U.S. Application Data

(63) Continuation-in-part of application No. 09/339,325, filed on Jun. 23, 1999, which is a continuation-in-part of application No. 09/131,048, filed on Aug. 7, 1998, now Pat. No. 6,285,989.

(51) Int. Cl.
G06Q 30/00 (2006.01)

(52) U.S. Cl. .......................................... 705/37; 705/14

(58) Field of Classification Search ................ 705/37, 705/26, 14
See application file for complete search history.

(56) References Cited

U.S. PATENT DOCUMENTS

| | | | |
|---|---|---|---|
| 3,581,072 A | 5/1971 | Nymeyer | |
| 4,789,928 A | 12/1988 | Fujisaki | |
| 5,101,353 A | 3/1992 | Lupien et al. | |
| 5,136,501 A | 8/1992 | Silverman et al. | |
| 5,319,542 A | 6/1994 | King, Jr. et al. | |
| 5,603,034 A | 2/1997 | Swanson | |
| 5,689,652 A | 11/1997 | Lupien et al. | |
| 5,727,165 A | 3/1998 | Ordish et al. | |
| 5,745,765 A | 4/1998 | Paseman | |
| 5,774,873 A | 6/1998 | Berent et al. | |
| 5,794,207 A | 8/1998 | Walker et al. | 705/23 |
| 5,794,219 A | 8/1998 | Brown | 705/37 |
| 5,799,284 A | 8/1998 | Bourquin | |
| 5,802,502 A * | 9/1998 | Gell et al. | 705/37 |
| 5,812,572 A | 9/1998 | King et al. | 372/38 |
| 5,812,668 A | 9/1998 | Weber | |
| 5,835,896 A * | 11/1998 | Fisher et al. | 705/37 |
| 5,844,554 A | 12/1998 | Geller et al. | |
| 5,845,265 A * | 12/1998 | Woolston | 705/37 |
| 5,845,266 A | 12/1998 | Lupien et al. | 705/37 |
| 5,862,223 A | 1/1999 | Walker et al. | |
| 5,873,071 A | 2/1999 | Ferstenberg et al. | |
| 5,890,137 A | 3/1999 | Koreeda | |
| 5,890,138 A | 3/1999 | Godin et al. | |

(Continued)

FOREIGN PATENT DOCUMENTS

JP        409171531 A   *   6/1997

OTHER PUBLICATIONS

Search Report dated Oct. 18, 1999, 3 pgs.

(Continued)

*Primary Examiner*—Jeffrey D Carlson
(74) *Attorney, Agent, or Firm*—Van Pelt, Yi & James LLP

(57) ABSTRACT

A universal or special-purpose auction system and method are disclosed wherein at least one auction allocation policy is implemented which results in adjusting a bid submitted by a trader or a clearing calculation is modified to incorporate a constraint.

20 Claims, 6 Drawing Sheets

U.S. PATENT DOCUMENTS

| | | | |
|---|---|---|---|
| 5,905,975 | A | 5/1999 | Ausubel |
| 5,913,210 | A | 6/1999 | Call |
| 5,950,001 | A | 9/1999 | Hamilton et al. |
| 5,966,699 | A | 10/1999 | Zandi |
| 6,014,643 | A | 1/2000 | Minton |
| 6,026,383 | A * | 2/2000 | Ausubel .................. 705/37 |
| 6,055,518 | A * | 4/2000 | Franklin et al. ............ 705/37 |
| 6,085,169 | A | 7/2000 | Walker et al. |
| 6,101,484 | A * | 8/2000 | Halbert et al. ............ 705/26 |
| 6,146,272 | A | 11/2000 | Walker et al. ........... 273/138.1 |
| 6,269,343 | B1 | 7/2001 | Pallakoff ................. 705/26 |
| 6,285,987 | B1 * | 9/2001 | Roth et al. ................ 705/27 |
| 6,285,989 | B1 | 9/2001 | Shoham |
| 6,405,180 | B2 * | 6/2002 | Tilfors et al. ............. 705/37 |
| 6,449,601 | B1 | 9/2002 | Friedland et al. |

OTHER PUBLICATIONS

ONSALE: About ONSALE; Copyright 1996 ONSALE, 2 pgs.
ONSALE; Auction Formats; Copyright 1996 ONSALE; 2 pgs.
ONSALE: Auction Supersite; Copyright 1997 ONSALE, Inc.; Sep. 8, 1997; 7 pgs.
ONSALE Home; Copyright 1997 ONSALE, Inc.; Sep. 8, 1997; 4 pgs.
Current Christmas Wishes 1991; Christmas 1991; 4 pgs.
Search Report for PCT/US00/15982; mailed Aug. 23, 2000; 6 pgs.
Search Report for PCT/US00/17449, mailed Nov. 14, 2000, 4 pages.
Frook, John Evan, Packaged apps give auctioneers rich new options, Internetweek, May 25, 1998, Issue 716, p. 14, 4/7 p. 2 graphs, 2 pgs.
Trommer, Diane, Moai intros auction software, Electronic Buyer's News, Mar. 23, 1998, Issue 1101, p. 78, 1/4p, 2 pgs.
Wilder, Clinton, Auctions for business, Information Week, Mar. 16, 1998, Issue 673, p. 90,2/3p, 1c., 2 pgs.
Millman, Howard, Legacy data links shrink costs, Info World, Jan. 5, 1998, vol. 20, Issue 1, p. 51, 2p, 1 chart, 1c, 4 pgs.
Opensite Technologies Introduces Innovative Web Auction Partner Program, Business Wire p. 08041472, Aug. 4, 1998, 3 pgs.
Mase, K, et al., Scripting method based on temporal intervals for designing interactive systems, Transactions of the Information Processing Society of Japan, May 1, 1998, vol. 39,Issue 5, p. 1403-13, 2 pgs.
Emaze Software offers WebThread, ScriptWizard on BuyDirect.com, Business Wire p. 12120089, Dec. 12, 1996, 3 pgs.
Cohen, Emily, Going . . . Going . . . Gone!(Fairmarket's Web Auction site, and Emaze Software's Emaze Auction Web auction software), PC Magazine, vol. v17, Issue n15, Sep. 1, 1998, 2 pgs.
Lal, Rajiv, et al.; An Approach For Developing An Optimal Discount Pricing Policy; Management Science, vol. 30, No. 12, Dec. 1984, pp. 1524-1539; The Institute of Management Sciences.
International Preliminary Examination Report for PCT/US00/15982; mailed May 8, 2001, 1 pg.
Babiarz, Alec J., et al. "*Automating Underfill for Non-Traditional Packages, Secondary CSP Underfill, Stacked Die, and No-Flow Underfill*", SMTA/Pan Pacific, Maui, HI, Jan. 2000, (6 pp.).
IPER for PCT/US99/17248 dated Apr. 27, 2001, 6 pgs.
Written Opinion for PCT/US00/17449 dated Apr. 25, 2001, 7 pgs.

* cited by examiner

METHOD AND AN APPARATUS FOR A TRADING MARKET DESIGN AND DEPLOYMENT SYSTEM

REFERENCE TO RELATED APPLICATIONS

The present application is a Continuation-In-Part of co-pending U.S. application Ser. No. 09/339,325 filed Jun. 23, 1999, which is a Continuation-In-Part of U.S. application Ser. No. 09/131,048, now U.S. Pat. No. 6,285,989 filed Aug. 7, 1998.

FIELD OF THE INVENTION

The present invention relates to the use of networked computer systems in a trading market. More specifically, the invention relates to an auction engine having modular components representing dimensions of auction specifications wherein at least one of the modular components is capable of adjusting a bid submitted by a trader or of clearing the auction subject to allocation constraints.

BACKGROUND OF THE INVENTION

Simple auctions which do not require complex computations are available on the Internet. eBay.com, Onsale.com, and Priceline.com are representative of such auctions. Onsale, Inc. and Priceline, Inc. use customized software specific to their particular auction rules. However, none of these auctions automatically adjusts a bid submitted by a trader based upon factors such as the type of trader submitting the bid or a preference granted to a trader based upon the quantity of goods which he wishes to purchase. For example, a group of traders may be granted preferential treatment based upon the amount of goods that they have purchased in the past. Accordingly, bids submitted by these traders must be adjusted in some fashion to reflect the preferential treatment to the traders that may be granted by a market designer. In order for these auctions to incorporate such features, extensive labor would be required to modify the software to account for the various adjustments which may apply to a bid.

Toolkits embodied in software offered by Bonsai and Opensite may be used to construct and operate simple auctions. However, customization of an auction using these toolkits does not permit adjustment of a bid from a trader without significant labor.

In sum, the market designer of an Internet auction which includes adjustment on a bid has two options: develop software or expend significant labor to modify existing toolkits. Therefore, it is desirable to have a means to automatically adjust bids in Internet auction markets without engaging in lengthy software development.

SUMMARY OF THE INVENTION

Methods and apparatuses are disclosed for adjusting a bid submitted by a trader which is reflective of an applicable auction allocation policy. One embodiment of the invention relates to a universal auction specification system having a programmable auction server (PAS) wherein the PAS has a plurality of auction modules with at least one auction module which is capable of adjusting a bid. In another embodiment of the invention, a clearing calculation may be modified by one of the auction modules to reflect an auction allocation policy.

Other aspects and methods of the present invention, as well as apparatuses formed using these methods, are described further below in conjunction with the following figures.

DETAILED DESCRIPTION OF THE PREFERRED EMBODIMENT

Methods and apparatuses are disclosed related to a universal or special-purpose, interactive, real-time, trading market system serving traders communicating through the Internet or similar network wherein a submitted bid is adjusted to reflect an auction allocation policy. For example, an auction allocation policy may require that a trader or traders be granted preferential treatment. One way to grant preferential treatment to a trader is to adjust a bid submitted by a trader. The adjusted bid is then compared to bids submitted by other traders. In another embodiment of the invention, a clearing calculation may be modified by an auction module to reflect an auction allocation policy. The modification of the clearing calculation results in preferential treatment being granted to a trader or traders. In yet another embodiment of the invention, these auction allocation policies may be implemented through a universal auction specification system having a PAS wherein the PAS has a plurality of auction modules. Although the invention is generally described relative to a universal auction system, another embodiment of the invention relates to a special-purpose auction system which may be used to implement bid adjustment of a bid submitted by a trader or the modification of a clearing calculation. At least one auction module, such as a bid transformer or a clearer, corresponds to at least one of the following auction functions: transforming or adjusting a bid, or modifying a clearing calculation.

In the following detailed description, numerous specific details are set forth in order to provide a thorough understanding of the present invention. However, it will be evident to one skilled in the art that the present invention may be practiced without these specific details. In other instances, well known structures and devices are shown in block diagram form in order to avoid unnecessarily obscuring the present invention.

To understand the process of a bid adjustment, it is necessary to provide an overview of auction modules which may be used in designing an on-line auction system capable of automatically adjusting a bid. Thereafter, examples of various embodiments of the invention are provided.

Figure 1A:
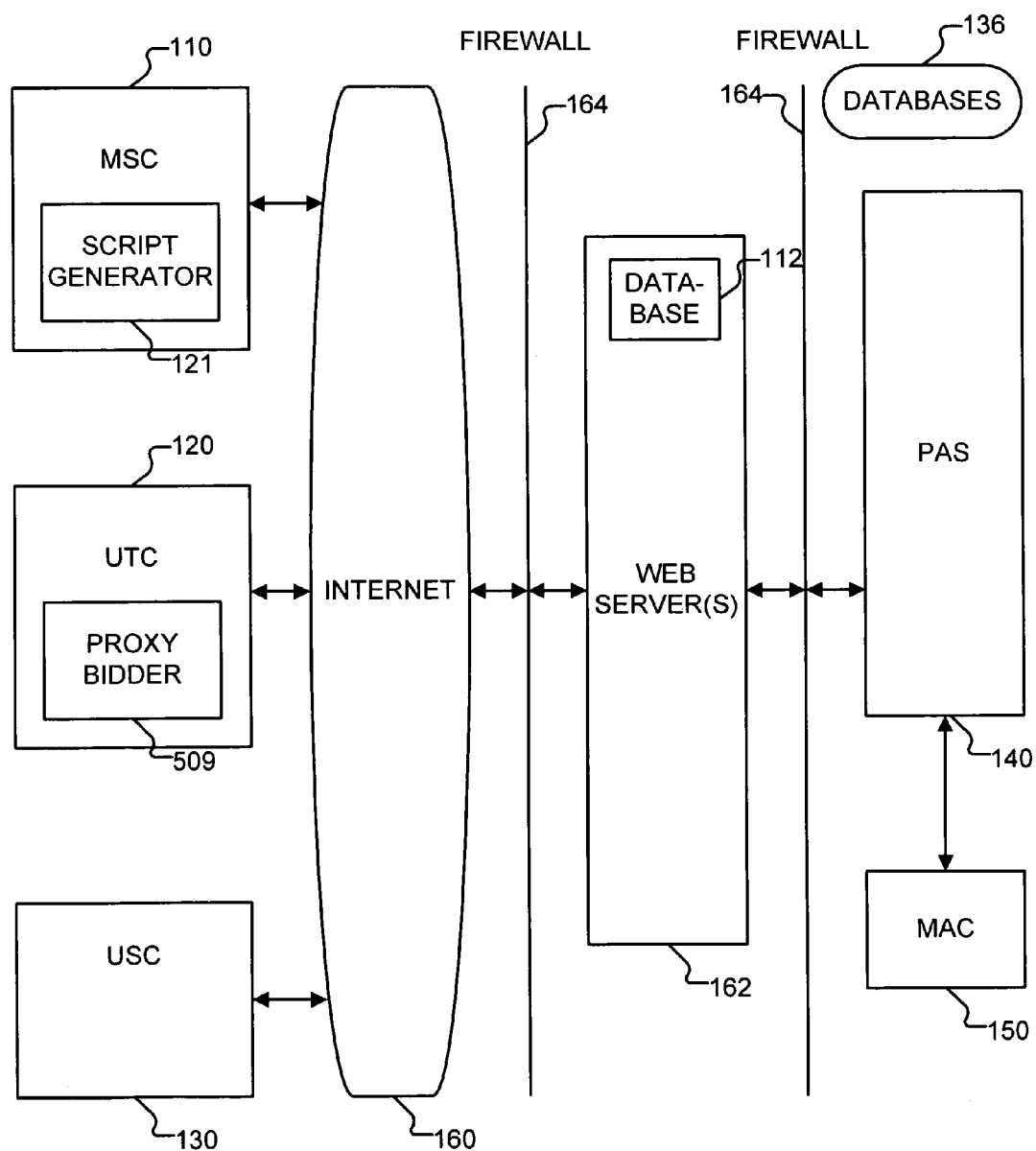
FIG. 1a is a system block diagram showing the components of the preferred embodiment.
Figure 1B:
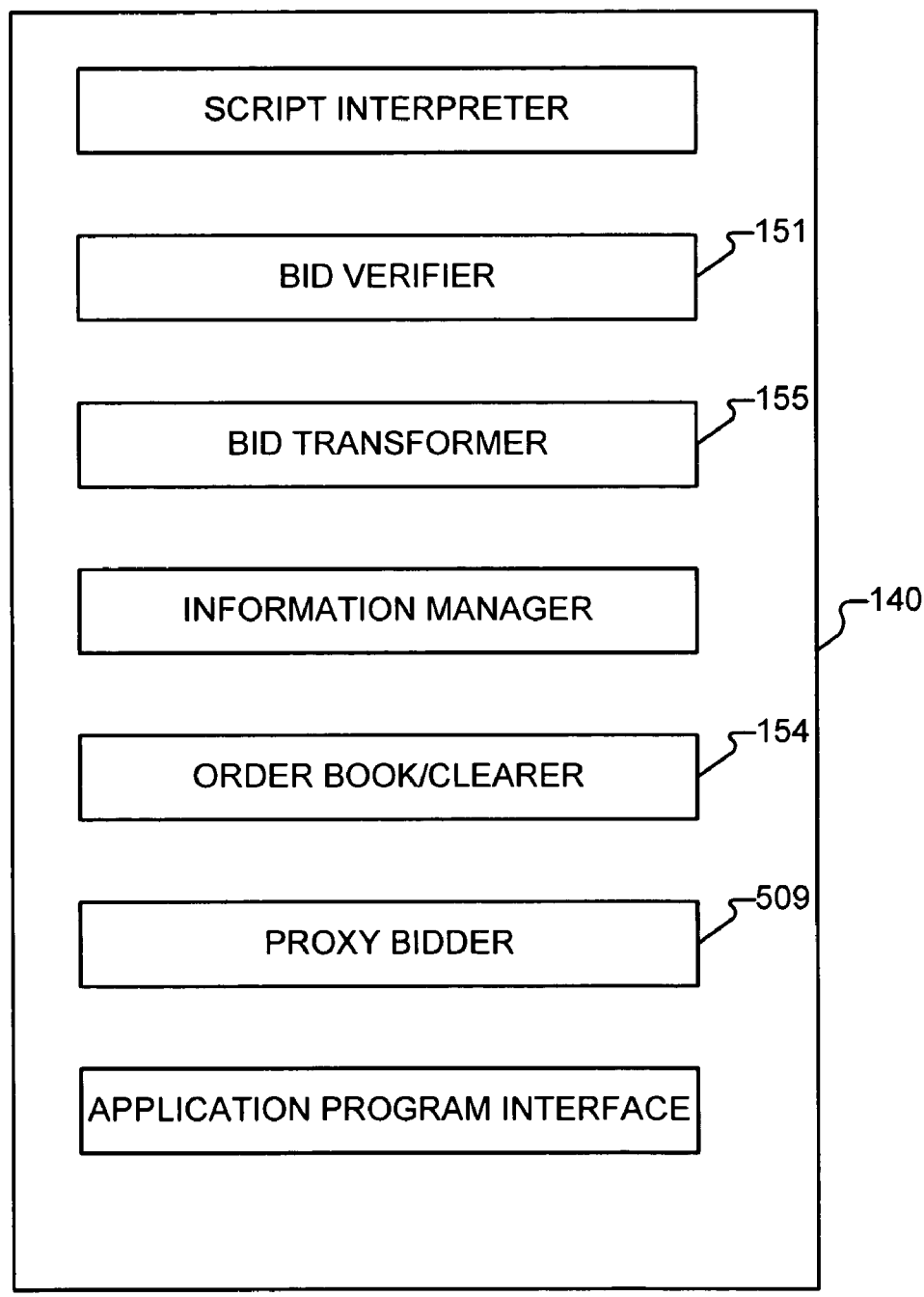
FIG. 1b is a diagram showing the programmable auction server of the system.

FIGS. 1a and 1b show a universal auction specification system of the invention which may include a variety of components, such as a Market Specification Console ("MSC") 110, a Universal Trading Console ("UTC") 120, a Universal Surveillance Console ("USC") 130, a Market Administration Console ("MAC") 150, PAS 140, a communication network 160 and 161 linking various components. These components may be stored or operated in a single computer system or in a plurality of computer systems connected by the Internet or similar network.

Overview of System Modules

Market Specification Console (MSC)

MSC 110 consists of a computer running a computer program in which the market designer may specify any of an infinite number of possible market protocols. Thereafter, the market defined by market protocols is submitted or uploaded to PAS 140 for execution. Market protocols may incorporate rules which are well known to auctions or the rules may be arbitrarily defined by the market designer.

Although markets may be organized in various ways, markets generally consist of a sequence of phases. Each phase comprises an interval or intervals wherein an activity is governed by a relatively fixed set of rules specified by the market designer. The temporal flow of a market consists of a series of market phases specified by the market designer. In order to specify this temporal flow, the market designer must identify the phases. Phases are identified and sequencing relations (e.g., termination conditions, conditional branching among the phases, etc.) are designated by manipulating representations of the phases on the Graphical User Interface ("GUI") of the MSC 110. A phase may be defined by a time period, a limitation, a condition (e.g., condition precedent, condition concurrent, condition subsequent, etc.), exception, exclusion, or a proviso, etc. The market designer may designate criteria such as when the phase terminates (e.g., a specified time period, condition such as the first one hundred bids received, etc.), the method to choose a succeeding phase (if any), and any other applicable limitations.

In order to specify rules, such as market rules, governing a particular phase, the market designer selects options—referred to herein as trading primitives ("TPs")—which dictate the behavior of components in the PAS 140. MSC 110 provides menus and other means for choosing options and may provide guidance to the market designer regarding eligible combinations of these options or recommend choices associated with specified design goals.

Universal Trading Console (UTC)

UTC 120 consists of a computer running a computer program which enables a trader (e.g., seller, buyer, agent of a seller or buyer) to trade in any market protocol executing on the PAS 140. UTC 120 presents information to the trader in a manner which automatically adapts to a specific market protocol that is executing.

Bids submitted by a trader may be entered by direct bidding or proxy bidding. In direct bidding, the bidder selects an auction and enters a bid using the computer keyboard and mouse (e.g., the interface provided by UTC 120). In proxy bidding, the user defines a script that bids on his or her behalf in one or more auctions running on the PAS 140. As part of the proxy bid, a trader also specifies whether the script is to run within the trader console UTC 120 (e.g., proxy bidder 508) or be transmitted to the PAS 140 and run there (e.g., proxy bidder 509).

Universal Surveillance Console (USC)

USC 130 consists of a computer running a computer program which enables a surveillance body such as a regulatory agency or an independent audit firm to monitor the operation of the markets executing on the PAS 140. This function allows the surveillance body to determine whether the execution of an auction conforms to norms and, optionally, to intervene in the market when deviations are detected.

Market Administration Console (MAC)

MAC 150 consists of a computer running a computer program which enables a market operator, an entity housing the PAS 140 and responsible for the operation of the PAS, to monitor the execution of various markets operating on the PAS 140. MAC 150 also administers registration transactions, such as the process whereby traders identify themselves to the system (e.g., providing their names and credentials etc.). Additionally, MAC 150 allows market operators to troubleshoot the system in real-time.

Programmable Auction Server (PAS)

PAS 140 includes a computer which runs a computer program which may accept multiple market protocols submitted to it from an MSC 110 and execute multiple market protocols (e.g., opening auctions, admitting or rejecting bids, clearing prices, notifying traders of market events, and closing auctions, etc.). More specifically, PAS 140 employs several modules to control the market operation. Modules such as bid transformer, clearer, bid verifier, and information manager assist in managing the market by processing incoming bids, responding to queries, maintaining market state (e.g., tracking bids, etc.), and reporting results to traders and, optionally, to non-traders. Through these modules, various transactions may be performed such as bid transformation (e.g., adjusting a bid submitted by a trader by increasing or decreasing the bid to reflect an auction allocation policy granted to a trader), clear (e.g., clearing the prices or bids), bid verification (e.g., determining whether a bid from a trader qualifies as a "bid" under the rules), release of information (e.g., showing all the current bids), and registering of information (e.g., name and phone number of the trader).

PAS 140 is extensible and flexible. Modules may be added or customized for different market protocols in PAS 140. In order to avoid obscuring the nature of the invention, three modules are discussed herein—the bid transformer 155, the order book/clearer ("clearer") 154, and the bid verifier 151. However, one skilled in the art will understand that other modules or subroutines may be used to perform the tasks of bid transformer 155, clearer 154, and bid verifier 151.

1. Bid Transformer

Bid transformer 155 implements auction allocation policies (also referred to as "discriminating allocation market protocols"). Based upon auction allocation policies, bid transformer 155 adjusts the original bid submitted by a trader. Auction allocation policies may be based upon a variety of factors. For example, the market designer may use factors such as the identity of the trader submitting the bid ("trader identity"), the quantities allocated to a trader identity, or any other condition which the market designer designates. Trader identity may be associated with individual traders or established groups (e.g., certified dealers, registered clients, holders of particular credit ratings, etc.).

A straightforward example is provided to illustrate bid transformation. If a particular trader, such as Trader A, is entitled to a discount of 20%, then its offered price is increased by an amount such that reduction by 20% equals the original bid. Accordingly, a bid of $10 by Trader A is transformed to $12.50. This transformed bid of $12.50 is then compared to the bids submitted by other traders. If A's bid is successful, A only pays $10. In essence, bid transformer 155 implements bid allocation policies internally in the sense that all of the calculations are performed such that the result of the calculation need not be displayed unless the transformed bid is the prevailing bid.

Another example of an auction allocation policy relates to offered prices for quantities of goods (or services such as the number or duration of specified tasks) above a certain threshold amount. Quantities of goods may be assessed a "penalty" percentage to bias the allocation toward a broader (as opposed to a more concentrated) distribution of traders. By way of illustration, a 10% penalty may be imposed for quantities of widgets over 100. An offer to buy 150 widgets at a price of $20 is transformed into an offer to buy 100 at $20 and another 50 at $18. This offer to buy is then compared to other offers to buy the widgets. However, if the trader is successful, the trader still must pay $20 for all 150 units.

While the above examples show the manner in which auction allocation policies are applied, one skilled in the art will understand that auction allocation policies are limitless; therefore, auction allocation policies can create many different applications. Auction allocation policies are only limited by the imagination of those individuals creating them. After the bids are transformed by bid transformer 155, the transformed bids are sent to bid verifier 151. Bid verifier 151 checks the transformed bid to verify that the bid satisfies the bid criteria which have been established. If the bid satisfies the bid criteria, the bid is admitted into the order book. If not, the bid is not admitted. The transformed bid may satisfy the bid criteria even though the original bid from a trader may not satisfy such criteria. Alternatively, an original bid may satisfy such criteria whereas the transformed bid may not satisfy such criteria.

2. Clearer

One alternative method to the preferred method involves implementing an auction allocation policy using the clearer 154. In this approach, bids are not transformed. Instead, a clearing calculation is modified to implement the auction allocation policy. The manner in which clearer 154 operates and implementation of constraints are described below.

(a) Operation of Clearer

Clearer 154 determines an allocation of goods and terms of an exchange based upon clearing policies. Generally, an allocation depends upon prices and quantities of all the offers received. Clearing policies may incorporate factors such as bidding history, auction rules, or any other factors designated by the market designer. An auction allocation typically corresponds to a set of trades among the auction participants. Once the trades are determined, the results are reported to traders and, optionally, non-traders. Clearer 154 uses the bid state as represented by the order book in order to derive the exchanges determined by auction rules in a given bid state. In addition to determining exchanges, clearer 154 may also invoke a trade manager module to control the notification and execution of these trades.

Clearer 154 is invoked according to the temporal flow TPs specified in the MSC. An auction allocation policy may be specified by naming the algorithm which implements a function from the auction state or by defining a complete set of criteria for selecting among the possible allocations (e.g., allocations consistent with the offers represented by bids) to apply to a bid.

Clearer 154 may use a general class of clearer policies which may be defined by interpreting the offers specified in bids as if they represent value functions and maximizing the resulting surplus. However, this maximization is generally not unique because monetary transfers are zero-sum operations.

Clearer 154 may use another type of clearing policy which determines exchanges based upon chronological priority. For example, the continuous double auction ("CDA") matches buyers and sellers instantaneously upon receiving compatible offers. The release of information about the exchange may be delayed. In contrast, a call market aggregates bids over time before determining an allocation. As the clearing interval of a call market is reduced, an approximate CDA is determined.

Clearer 154 may use discriminatory or non-uniform-price auctions which may allocate identical goods to different traders at different prices. For example, in pay-your-bid auctions, successful traders on one side exchange for exactly the amount they bid, regardless of terms for other successful traders.

(b) Constraints

Just as clearing calculations are limitless, constraints also have no bounds with regard to the number of them which may be applied or the type of constraint imposed. If the preferential allocation policy dictates that no group should receive more than one-half of the allocated quantity, an algorithm used in the clearing module ensures that this quota is not exceeded. A general approach to incorporating constraints exploits the fact that most clearing calculations may be cast in terms of maximization of an objective function. For example, in a typical one-sided auction, the clearing allocation generally maximizes revenue (in a buy-side auction) or minimizes cost (in a sell-side auction), given the face value of offers. In such cases, preferential allocations may be implemented in a straightforward way by making the optimization subject to specified constraints. For example, to incorporate the constraint method mentioned above, the clearing calculation would apply the same objective criteria which it would otherwise apply (e.g., maximize revenue); however, the clearing calculation would be subject to the constraint that no group receives more than one-half of the total quantity. Accordingly, a clearing calculation such as profit maximization=(x) would be changed to incorporate the following constraint:

Constraint: not more than one half of the widgets may be distributed to a group in which traders are referred to as Traders A. This equation is expressed as follows:

$$\text{Constraint on widgets distributed to Traders } A \leq \tfrac{1}{2}x$$

wherein x represents the total quantity of widgets which are to be sold. Clearer 154 invokes a clearing calculation and then determines if a constraint is applicable. If so, the clearing calculation is modified by clearer 154 to incorporate this constraint. While this example shows clearer 154 modifying the clearing calculation, other modules may be used to perform the same function.

One skilled in the art will appreciate that using the bid transformer approach or the clear module approach may be combined in an auction. For example, preferences may be implemented through bid transformations whereas constraints may be implemented through modification of the clearing calculation. In another approach, the modified clearing calculation may account for preferences (through adjustment of the optimization criterion) without applying any bid transformations.

Regardless of the allocation policy specified, the invention is capable of realizing each by allowing the market designer to specify an available TP or integrate an entirely new component into PAS 140 in order to supplement an auction allocation policy.

3. Bid Verifier

Bid verifier 151 tests each incoming bid for consistency with the bidding rules established by the market designer. A "bid" is defined as an expression of an action which may modify a bid state. Bids include a variety of actions, such as a buyer indicating a willingness to purchase a good at a certain price or a withdrawal of a previous bid. Changing a bid qualifies as a new bid. If verified as an eligible bid, the bid is admitted to an order book; otherwise, the bid is rejected. There are many possible varieties of bidding rules which may be specified in TPs through the MSC 110.

In one embodiment, bid verifier 151 operates such that the incoming bid is compared to a bid referred to as a base bid. The base bid may refer to the trader's own bid, to all bids, or to some summary (e.g., a price quote), as determined by applying the bid rules. For example, assume a bidding rule requires that, in order for a bid to be eligible, a bid must meet the following requirement:

$$bid = \text{highest bid received} + x$$

wherein x equals $20 and the highest bid received for that auction at a certain period of time is assumed to be $100. The highest bid represents the base bid. In this example, the base bid is replaced with a higher bid. The higher bid is then referred to as the base bid. The incoming bid must be at least $120 to be entered into the order book.

In one embodiment, each bid is subjected to a bid transformer 155 which applies an auction allocation policy to the bid. Bid transformation may occur before or after bid verification. The market designer determines whether bid transformation occurs before or after bid verification. Preferably, bid transformation occurs before bid verification.

Figure 2:
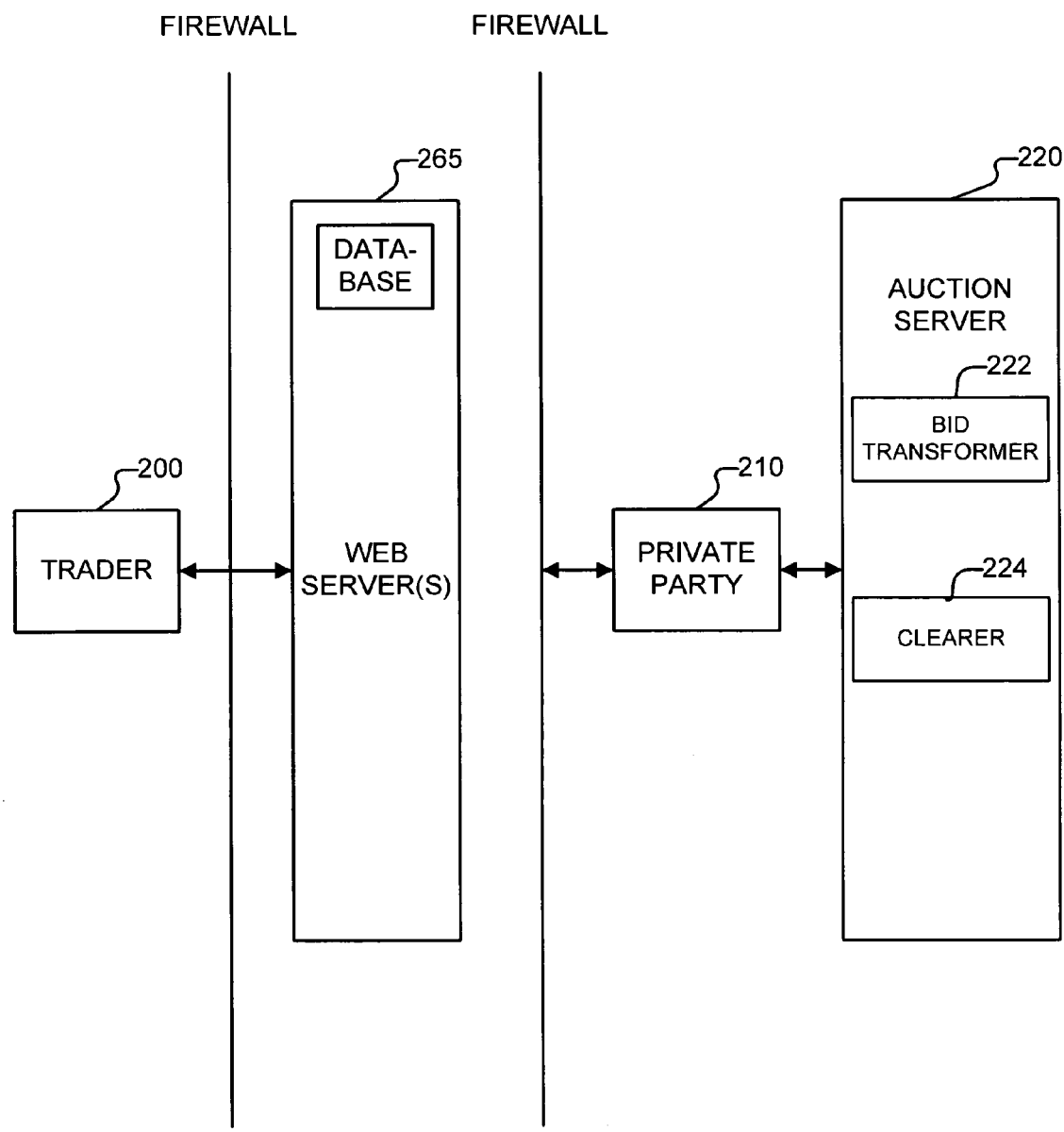
FIG. 2 shows a special-purpose auction system.

Although various embodiments of the invention have been provided in terms of a universal auction system framework, a special-purpose on-line auction system may also be used as shown in FIG. 2. The number of special-purpose on-line auction systems is limitless.

FIG. 2 shows data transfer capable of occurring between trader 200 and database 205 of a web server. Optionally, a firewall may exist between trader 200 and database 205. Data transfer may also exist between private party 210 and database 205. Again, the firewall between private party 210 and database 205 is optional. Data may also be transferred between private party 210 and auction server 220.

Auction server 220 serves a similar purpose as the PAS; however, auction server 220 is not programmable like the PAS. Instead, auction server 220 is designed such that it is capable of running a special-purpose auction. As a result, auction server 220 reflects the specific requirements of a market designer and generally cannot be modified to be used in a universal manner without expending a significant amount of labor.

Auction server has a bid transformer 222 and a clearer that operate in the same fashion as bid transformer 155 and clearer 154 in the universal auction system. It will be appreciated that although only two modules are shown, multiple modules may exist in order to implement the requirements of a particular market designer.

One example of a special-purpose auction system may relate to an auction module which is specifically geared toward an auction of off-specification U.S. military supplies. The U.S. military may contract with a private party to produce and manage the special-purpose auction system. This special-purpose auction system may require bids to be received by the private party who verifies that the trader is authorized to bid on goods from the U.S. military. The bids from authorized traders then undergo transformation (if applicable) through a bid transformer. On the other hand, a clearing calculation may be modified by a clearer to implement a constraint.

Under this special-purpose system, a trader is notified when it has been determined that the trader's bid is inadequate or is the prevailing bid. As noted above, FIG. 2 merely shows one embodiment of a special-purpose auction system. One skilled in the art will understand that the invention is not limited to this embodiment of a special-purpose on-line auction; rather, numerous special-purpose auctions may be made.

Figure 3:
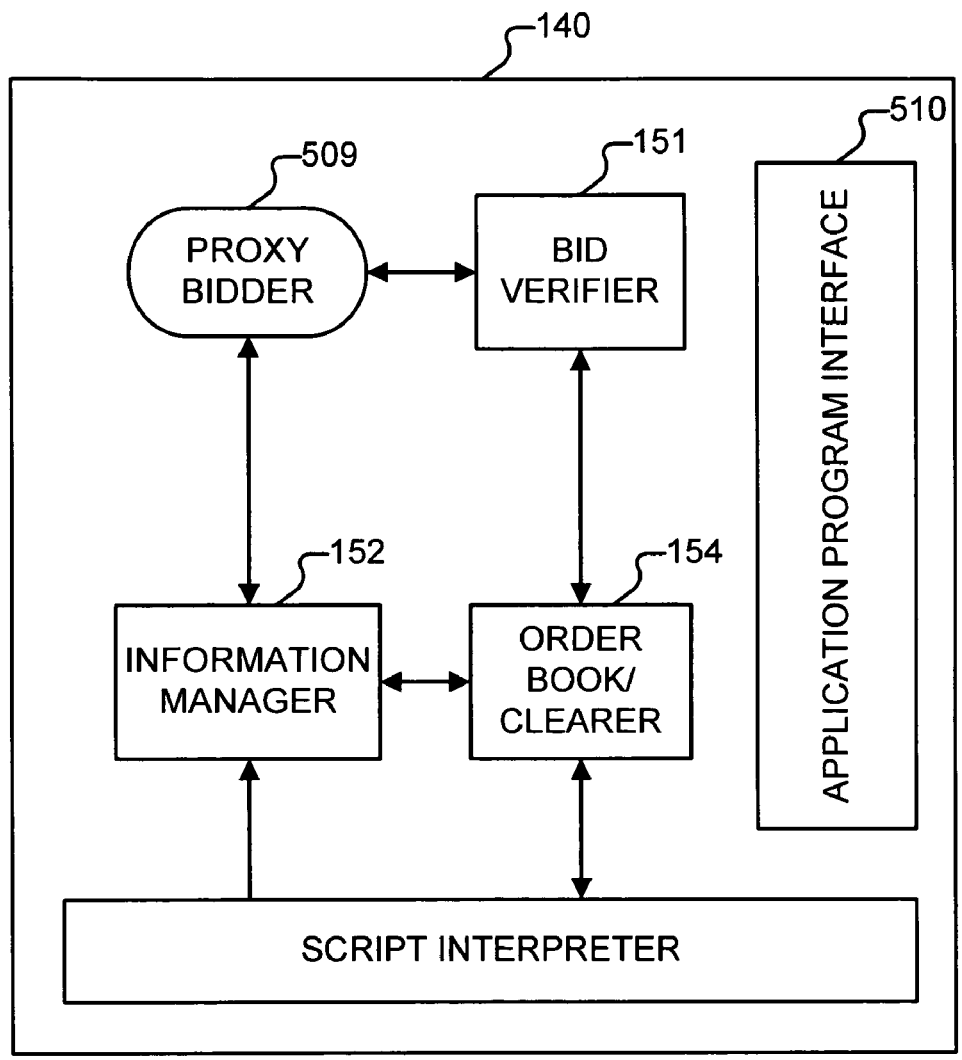
FIGS. 3 and 4 show schematically one embodiment of the invention wherein a bid is received and is verified.
Figure 4:
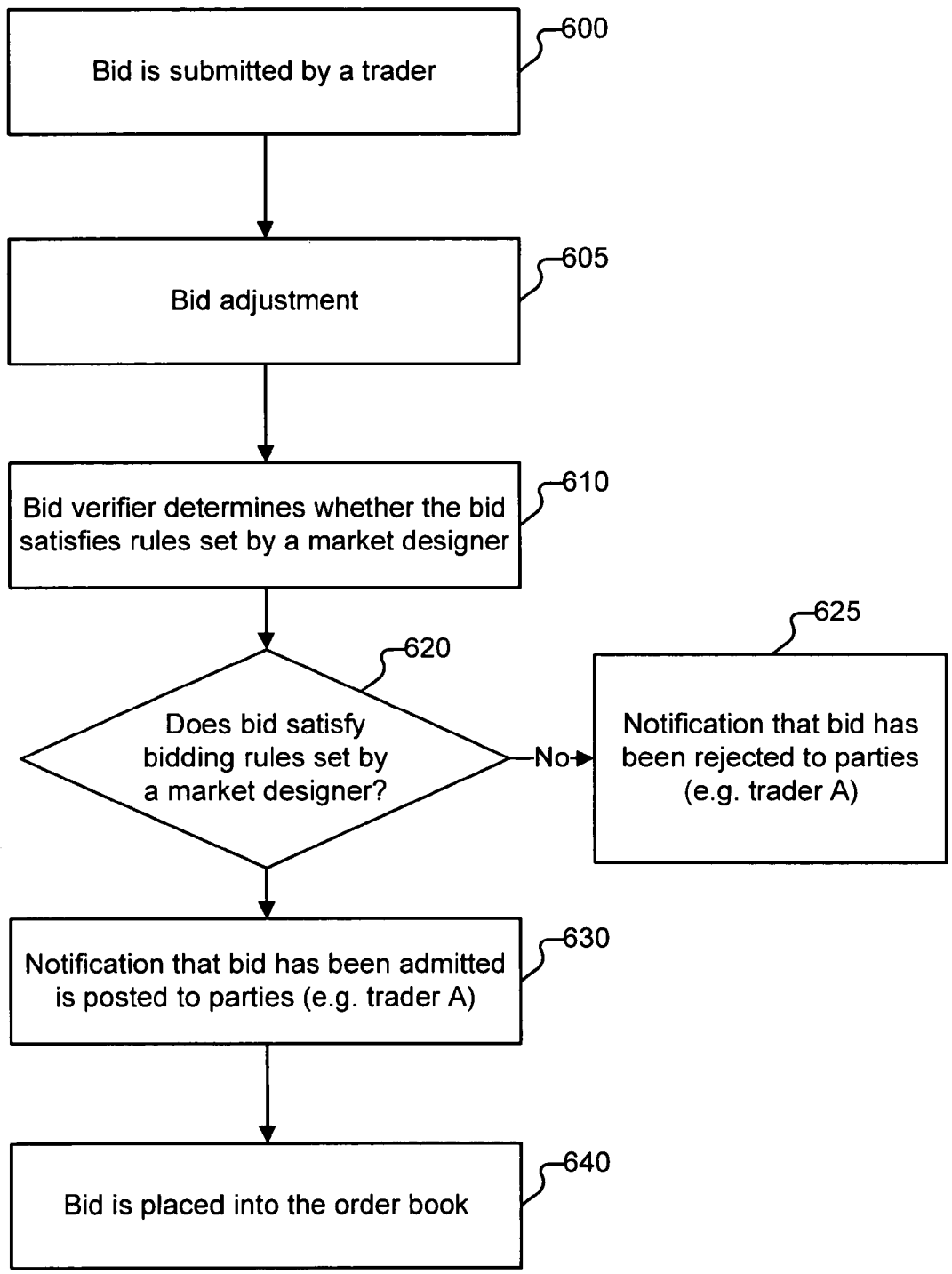

FIGS. 3 and 4 show schematically various embodiments of the invention in which several of the modules of the PAS are shown. Here, a bid (e.g., $100) is submitted by Trader A at operation 600. At operation 605, the bid is adjusted. In one embodiment, the bid may be adjusted by bid transformer 155 transforming the bid submitted by a trader. In another embodiment, clearer 154 may adjust a cleared bid by modifying the clearing calculation. In another embodiment of the invention, preferences granted to a trader may be implemented through bid transformer 155 and constraints to a transaction may be implemented through modification of the clearing calculation.

The bid is sent to the bid verifier 151 at operation 610. Bid verifier 151 receives the bid and compares the bid to the rules specified in the TPs. At operation 610, the bid verifier determines whether the bid is acceptable. A bid is acceptable if the bid meets the requirements set forth in the rules found in the TPs. An unacceptable bid is one that does not satisfy the rules found in the TPs. If, at operation 620, the bid satisfies the minimum standards for an acceptable bid established by the market designer, the bid is verified as an acceptable bid, the trader is notified of this at operation 630, and the bid is placed into the order book at operation 640. If the bid fails to meet these minimum standards at operation 620, the bid is rejected and the trader is notified that his bid is unacceptable. Information manager 152 notifies the trader by transmitting the rejection to him or her at operation 625. Similarly, proxy bidder 509 may also submit a bid to the bid verifier 151. This bid undergoes the same process as discussed above. The trader who submitted the proxy bid is notified through the information manager 152 as to whether the proxy bid is acceptable. Application Program Interfaces 510 provide a means for extending the PAS to incorporate replacement or additional modules.

Figure 5:
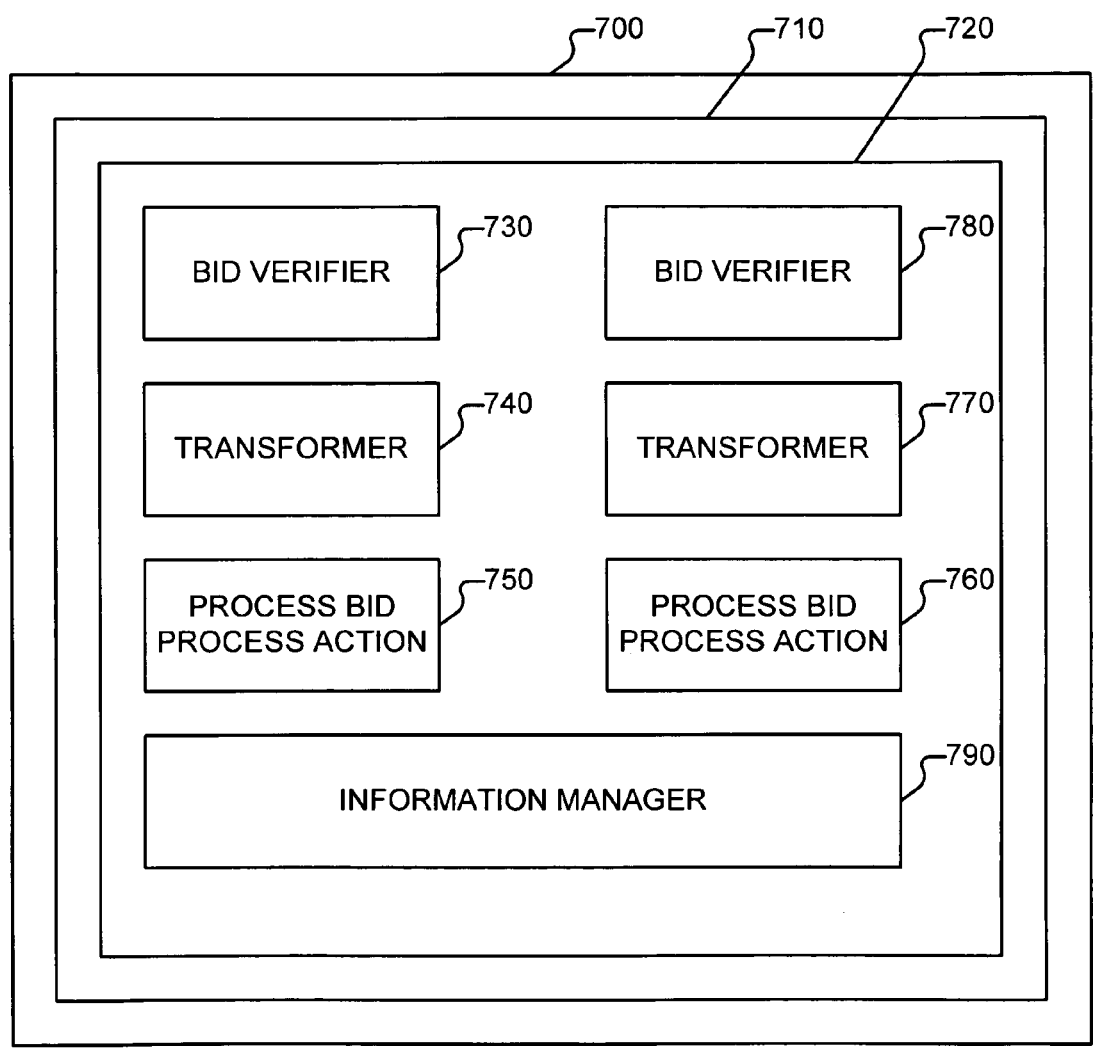
FIG. 5 shows the data flow of the invention.

FIG. 5 shows data flow of one embodiment of the invention. A market 700 comprises an auction 710. Although a market may include a plurality of phases, only one phase is shown in operation 720. With respect to a plurality of phases, one skilled in the art will appreciate that an auction specification of one phase may be replaced by methods known in the art with an auction specification of another phase. An eligible bid may be sent to the bid transformer at operation 730. At this operation, the bid is modified to reflect auction allocation policies wherein the bid may be increased, decreased, or modified in some other way in order to reflect a status which has been granted to that particular trader for a particular good or transaction. A bid submitted by a trader is sent to bid verifier 151 at operation 740. Bid verifier 151 determines whether the bid meets certain rules which are specified by the market designer or another party who may control an aspect of the auction. One skilled in the art will understand that bid transformation (or the clearing operation by clearer 154) may occur either before or after bid verification. At operation 750, the bid is verified (i.e., meets the established criteria for a bid). If the bid is verified, the bid is then submitted to the order book at operation 760. At this operation, tie-breaking rules may be applied, sort criteria may be used, and any other criteria designated by the market designer may be implemented. At operation 770, the bid is submitted to the clearer 154. Clearer 154 determines whether any constraints exist. Clearer 154 also determines whether any constraints are applicable to the bid. If a constraint applies to a bid, clearer 154 modifies the clearing calculation(s) by incorporating or implementing the requirements of the constraint(s). At operation 780, the bids are submitted to the trade manager for further processing. The information manager is continuously operating and may be providing information to traders on a continuous basis at operation 790.

Thus, a method and apparatus for designing and deploying a universal, interactive, real-time, trading market system serving traders communicating via the Internet or similar network is disclosed. Although the present invention has been described with reference to specific exemplary embodiments, it will be apparent to those skilled in the art that various modifications and augmentations may be made to these embodiments without departing from the broader spirit and scope of the present invention as set forth in the following claims.

We claim:

1. An online auction system comprising:
   an auction server;
   a market specification console coupled to the auction server over a network, wherein the market specification console configured to enable a market designer to specify a market phase for an auction, the market phase having a predefined termination time, and wherein the market specification console is configured to enable a market designer to define an auction allocation policy to govern the market phase;
   an auction module coupled to the auction server, the auction module configured to perform a transaction to automatically adjust a submitted bid for an item during an auction, wherein the submitted bid is associated with a trading identity, wherein the adjustment to the bid is based on the auction allocation policy, wherein the adjusted bid is to be compared with a plurality of competitive submitted bids to determine whether the adjusted bid is successful, each of the plurality of competitive submitted bids is associated with a plurality of competitive trading identities, wherein the submitted bid indicates an amount due for the item when the adjusted bid is successful, and wherein the submitted bid is a different value relative to the adjusted bid;
   a universal trading console configured to receive during the market phase of the auction a first bid for an item having a fixed quantity from a first trader over the network, wherein the first bid has a first bid price and a first bid quantity, the first bid being one of a plurality of bids from a plurality of traders during the market phase, wherein the first trader is one of the plurality of traders;
   a bid transformer configured to automatically adjust the first bid price received during the market phase of the auction from the first trader based upon the allocation policy associated, wherein the bid transformer coupled to the universal trading console via a network;
   a bid verifier configured to check the adjusted first bid price to verify that the first bid satisfies a set of bid criteria to determine whether the first bid is admitted for the market phase; and
   a clearer coupled to the auction server, the clearer configured to compare the adjusted first bid price with a plurality of admitted bids for the market phase, wherein the clearer is configured to select a plurality of successful bids from the plurality of admitted bids including the first bid and a second bid after the predefined termination time, the second bid having a second bid price and a second bid quantity, the second bid being from a second trader of the plurality of traders, the second trader being associated with a predefined group according to the allocation policy, wherein the clearer is configured to allocate a first quantity of the item for the first bid, wherein the clearer is configured to allocate a second quantity of the item for the second bid, the second quantity being no greater than a predefined percentage of the fixed quantity, the predefined percentage being associated with the group according to the allocation policy, the sum of the first quantity and the second quantity being no greater than the fixed quantity, the first bid price to indicate an amount due for the item, wherein the first bid price is a different value relative to the adjusted first bid price.

2. The auction system of claim 1, wherein the adjusted first bid price is greater than the first bid price.

3. The auction system of claim 1, wherein the adjusted first bid price is less than the first bid price.

4. The auction system of claim 1, wherein the auction allocation policy indicates a trader of the predefined group is entitled to a price discount.

5. The auction system of claim 1, wherein the auction allocation policy indicates a trader of the predefined group is entitled to a penalty percentage.

6. A machine-readable medium having instructions to cause a machine to perform a method for facilitating a trading market system, the method comprising:
   receiving at a server from a market designer via a market specification console instructions for specifying a market phase for an auction, the market phase having a predefined termination time;
   the server defining an auction allocation policy to govern the market phase;
   receiving via a universal trading console a first bid during the market phase of the auction for an item having a fixed quantity from a first trader via a network, the first bid having a first bid price and a first bid quantity, the first bid being one of a plurality of bids received from a plurality of traders during the market phase for the auction item over the network;
   using a bid transformer coupled to the universal trading console for adjusting automatically the first bid price during the market phase of the auction based on the auction allocation policy;
   using a bid verifier for checking the adjusted first bid price to verify that the first bid satisfies a set of bid criteria to determine whether the first bid is admitted for the market phase;
   comparing the adjusted first bid price with a plurality of admitted bids for the market
   after the predetermined termination time, selecting a plurality of successful bids from the plurality of admitted bids including the first bid and a second bid, the second bid having a second bid price and a second bid quantity, the second bid being from a second trader of the plurality of traders, and the second trader being associated with a predefined group according to the allocation policy;
   allocating a first quantity of the item for the first bid, the first bid price to indicate an amount due for the item, wherein the first bid price is a different value relative to the adjusted first bid price; and
   allocating a second quantity of the item for the second bid, the second quantity being no greater than a predefined percentage of the fixed quantity, the predefined percentage being associated with the group according to the allocation policy, wherein the sum of the first quantity and the second quantity is no greater than the fixed quantity.

7. The machine-readable medium of claim 6, wherein the allocation policy indicates a trader of the predefined group is entitled to a price discount.

8. The machine-readable medium of claim 6, wherein the allocation policy indicates a trader of the predefined group is entitled to be assessed a penalty percentage.

9. The machine-readable medium of claim 6, wherein the adjusted first bid price is less than the first bid price.

10. The machine-readable medium of claim 6, wherein the adjusted first bid price is greater than the first bid price.

11. A computer implemented method for online auction, comprising:
- receiving at a server from a market designer via a market specification console instructions for specifying a market phase for an auction, the market phase having a predefined termination time;
- the server defining an auction allocation policy based on the market phase;
- receiving via a universal trading console a first bid during the market phase of the auction for an item having a fixed quantity from a first trader via a network, the first bid having a first bid price and a first bid quantity, the first bid being one of a plurality of bids received from a plurality of traders during the market phase for the auction item over the network;
- using a bid transformer coupled to the universal trading console for adjusting automatically the first bid price during the market phase of the auction based on the auction allocation policy;
- using a bid verifier for checking the adjusted first bid price to verify that the first bid satisfies a set of bid criteria to determine whether the first bid is admitted for the market phase;
- comparing the adjusted first bid price with a plurality of admitted bids for the market phase selecting a plurality of successful bids after the predetermined termination time from the plurality of admitted bids including the first bid and a second bid, the second bid having a second bid price and a second bid quantity, the second bid being from a second trader of the plurality of traders, and the second trader being associated with a predefined group according to the allocation policy;
- allocating a first quantity of the item for the first bid, the first bid price to indicate an amount due for the item, wherein the first bid price is a different value relative to the adjusted first bid price; and
- allocating a second quantity of the item for the second bid, the second quantity being no greater than a predefined percentage of the fixed quantity, the predefined percentage being associated with the group according to the allocation policy, wherein the sum of the first quantity and the second quantity is no greater than the fixed quantity.

12. The method of claim 11, wherein the allocation policy indicates a trader of the predefined group is entitled to a price discount.

13. The method of claim 11, wherein the allocation policy indicates the a trader of the predefined group is entitled to be assessed a penalty percentage.

14. The method of claim 11, wherein the adjusted first bid price is less than the first bid price.

15. The method of claim 11, wherein the adjusted first bid price is greater than the first bid price.

16. An apparatus for online auction, comprising:
- means for receiving at a server from a market designer via a market specification console instructions for specifying a market phase for an auction, the market phase having a predefined termination time;
- means for the server defining an auction allocation policy based on the market phase;
- means for receiving via a universal trading console a first bid during the market phase of the auction for an item having a fixed quantity from a first trader via a network, the first bid having a first bid price and a first bid quantity, the first bid being one of a plurality of bids received from a plurality of traders during the market phase for the auction item over the network;
- means for using a bid transformer coupled to the universal trading console for adjusting automatically the first bid price during the market phase of the auction based on the auction allocation policy;
- means for using a bid verifier to check the adjusted first bid price to verify that the first bid satisfies a set of bid criteria to determine whether the first bid is admitted for the market phase;
- means for comparing the adjusted first bid price with a plurality of admitted bids for the market phase means for selecting a plurality of successful bids after the predetermined termination time from the plurality of admitted bids including the first bid and a second bid, the second bid having a second bid price and a second bid quantity, the second bid being from a second trader of the plurality of traders, and the second trader being associated with a predefined group according to the allocation policy;
- means for allocating a first quantity of the item for the first bid, the first bid price to indicate an amount due for the item, wherein the first bid price is a different value relative to the adjusted first bid price; and
- means for allocating a second quantity of the item for the second bid, the second quantity being no greater than a predefined percentage of the fixed quantity, the predefined percentage being associated with the group according to the allocation policy, wherein the sum of the first quantity and the second quantity is no greater than the fixed quantity.

17. The apparatus of claim 16, wherein the allocation policy indicates a trader of the predefined group is entitled to a price discount.

18. The apparatus of claim 16, wherein the allocation policy indicates a trader of the predefined group is entitled to be assessed a penalty percentage.

19. The apparatus of claim 16, wherein the adjusted first bid price is less than the first bid price.

20. The apparatus of claim 16, wherein the adjusted first bid price is greater than the first bid price.

* * * * *

UNITED STATES PATENT AND TRADEMARK OFFICE
CERTIFICATE OF CORRECTION

PATENT NO.       : 7,558,752 B1                                           Page 1 of 1
APPLICATION NO.  : 09/410856
DATED            : July 7, 2009
INVENTOR(S)      : Ephrati et al.

It is certified that error appears in the above-identified patent and that said Letters Patent is hereby corrected as shown below:

Column 11, line 48, Claim 13 delete "indicates the a trader" and insert -- indicates a trader --

Signed and Sealed this

Twenty-fourth Day of November, 2009

David J. Kappos
*Director of the United States Patent and Trademark Office*